(12) United States Patent
Kim

(10) Patent No.: US 10,994,611 B1
(45) Date of Patent: May 4, 2021

(54) FOLDABLE PEDAL DEVICE FOR AUTONOMOUS VEHICLE

(71) Applicants: Hyundai Motor Company, Seoul (KR); Kia Motors Corporation, Seoul (KR)

(72) Inventor: Eun Sik Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/996,570

(22) Filed: Aug. 18, 2020

(30) Foreign Application Priority Data

Apr. 9, 2020 (KR) .................. 10-2020-0043275

(51) Int. Cl.

| | | |
|---|---|---|
| *G05G 1/40* | (2008.04) |
| *B60K 26/02* | (2006.01) |
| *B60T 7/06* | (2006.01) |
| *B60R 21/09* | (2006.01) |
| *G05G 5/00* | (2006.01) |
| *G05G 5/28* | (2006.01) |
| *G05G 1/44* | (2008.04) |
| *G05G 1/38* | (2008.04) |
| *G05G 1/30* | (2008.04) |

(Continued)

(52) U.S. Cl.
CPC .............. *B60K 26/02* (2013.01); *B60R 21/09* (2013.01); *B60T 7/06* (2013.01); *G05G 1/40* (2013.01); *G05G 5/005* (2013.01); *G05G 5/28* (2013.01); *B60K 2026/026* (2013.01); *G05G 1/30* (2013.01); *G05G 1/38* (2013.01); *G05G 1/44* (2013.01); *G05G 5/03* (2013.01); *G05G 5/05* (2013.01)

(58) Field of Classification Search
CPC . B60R 21/09; G05G 1/30; G05G 1/32; G05G 1/36; G05G 1/38; G05G 1/40; G05G 1/44; G05G 1/445; G05G 5/005; G05G 5/03; G05G 5/05; G05G 5/28; B60K 26/02; B60K 26/021; B60K 2026/026; B60K 26/024; B60T 7/04; B60T 7/06; B60T 7/065

See application file for complete search history.

(56) References Cited

U.S. PATENT DOCUMENTS 2,836,990 A * 6/1958 De Heer .............. B60K 26/021 74/513
2,983,347 A * 5/1961 Risk ...................... B60K 26/02 477/207

(Continued)

FOREIGN PATENT DOCUMENTS

KR 10-2017-0137427 A 12/2017

*Primary Examiner* — Richard W Ridley
*Assistant Examiner* — Brian J McGovern
(74) *Attorney, Agent, or Firm* — Mintz Levin Cohn Ferris Glovsky and Popeo, P.C.; Peter F. Corless

(57) ABSTRACT

A foldable pedal device for an autonomous vehicle is provided. In a manual driving mode, in which the driver directly operates the vehicle, a pedal pad rotates backwards and pops up in a passenger compartment space to allow the driver to manipulate the pedal pad. In an autonomous driving mode, in which the driver does not directly operate the vehicle, the pedal pad rotates forwards and is hidden in an engine compartment space to be prevented from being exposed to the passenger compartment space and from being manipulated by the driver.

17 Claims, 6 Drawing Sheets

(51) Int. Cl.
  *G05G 5/03* (2008.04)
  *G05G 5/05* (2006.01)

(56) References Cited

U.S. PATENT DOCUMENTS

| | | | | |
|---|---|---|---|---|
| 5,063,811 A * | 11/1991 | Smith | ............ | G05G 1/46 |
| | | | | 74/513 |
| 6,182,525 B1 * | 2/2001 | Bowers | ............ | B60K 20/02 |
| | | | | 180/274 |
| 6,318,208 B1 * | 11/2001 | Thongs, Jr. | ............ | G05G 1/38 |
| | | | | 74/513 |
| 7,908,939 B2 * | 3/2011 | Kim | ............ | G05G 5/03 |
| | | | | 74/513 |
| 7,954,398 B2 * | 6/2011 | Lee | ............ | B60T 7/042 |
| | | | | 74/512 |
| 10,739,011 B2 * | 8/2020 | Cowan | ............ | F24C 3/126 |
| 2003/0230153 A1 * | 12/2003 | McVicar | ............ | B60T 7/042 |
| | | | | 73/865.5 |
| 2004/0040408 A1 * | 3/2004 | Shaw | ............ | G05G 1/405 |
| | | | | 74/560 |
| 2007/0205033 A1 * | 9/2007 | Hanson | ............ | G05G 1/36 |
| | | | | 180/90.6 |
| 2009/0223319 A1 * | 9/2009 | Choi | ............ | G05G 1/36 |
| | | | | 74/512 |
| 2011/0132134 A1 * | 6/2011 | Kim | ............ | G05G 1/30 |
| | | | | 74/514 |
| 2017/0225570 A1 * | 8/2017 | El Aile | ............ | B60R 7/06 |

* cited by examiner

FOLDABLE PEDAL DEVICE FOR AUTONOMOUS VEHICLE

CROSS-REFERENCE TO THE RELATED APPLICATION

This application claims priority from Korean Patent Application No. 10-2020-0043275, filed on Apr. 9, 2020, the disclosure of which is incorporated herein by reference in its entirety.

BACKGROUND

1. Field of the Disclosure

The present disclosure relates to a foldable pedal device for an autonomous vehicle, and more particularly to a foldable pedal device for an autonomous vehicle, in which a pedal pad protrudes into a passenger compartment space to be manipulated by a driver in a manual driving mode, and in which the pedal pad is introduced into an engine compartment space to prevent exposure of the pedal pad into the passenger compartment space and prevent the pedal from being inadvertently manipulated by the driver in an autonomous driving mode.

2. Description of the Related Art

An autonomous vehicle is a type of smart vehicle employing an autonomous driving technology by which the vehicle is capable of autonomously travelling to a set destination by itself without manipulation of the steering wheel, the accelerator, the brake, or the like by a driver. These days, the development of such autonomous vehicles is accelerating. To promote the commercialization thereof, autonomous vehicles enable selection between a manual driving mode, in which a driver directly operates the vehicle, and an autonomous driving mode, in which the vehicle autonomously travels to a destination without a driving operation or manipulation from the driver.

In the autonomous driving mode, a driver may desire to take a rest comfortably while stretching. In particular, when pedals (e.g., an accelerator pedal and a brake pedal) disposed in the space below the driver's seat remain exposed to the passenger compartment space of the vehicle, they may disturb the driver. Further, in the autonomous driving mode, in which the driver does not need to manipulate the pedals of the vehicle, when the driver manipulates the pedals, the controller of the vehicle determines that the driver desires to terminate the autonomous driving mode and to directly operate the vehicle, and terminates control for autonomous driving.

However, since the pedals of the vehicle are mounted in the space below the driver's seat and are thus exposed, the driver may unintentionally manipulate the pedals in the autonomous driving mode (e.g., the situation in which the pedals are erroneously manipulated), which may cause an accident depending on the road conditions, the distance between vehicles, or the like. Therefore, there is the need for development of a novel pedal device for exposing a pedal pad to a passenger compartment space for driver manipulation in a manual driving mode, in which the driver directly operates the vehicle, and preventing exposure of the pedal pad to the passenger compartment space to prevent erroneous manipulation of the pedal in an autonomous driving mode.

The information disclosed in this section is merely for enhancement of understanding of the general background of the disclosure and should not be taken as an acknowledgement or any form of suggestion that this information forms the related art already known to a person skilled in the art.

SUMMARY

Therefore, the present disclosure provides a foldable pedal device for an autonomous vehicle, which exposes a pedal pad into a passenger compartment space to allow for user manipulation in a manual driving mode, in which the driver directly operates the vehicle, and introduces the pedal pad into an engine compartment space to prevent exposure of the pedal pad to the passenger compartment space and thus preventing the pedal from being manipulated by the driver in an autonomous driving mode, thereby preventing erroneous manipulation of the pedal and thus securing the comfortable rest and safety of the driver in the autonomous driving mode.

In accordance with the present disclosure, the above and other objects may be accomplished by the provision of a foldable pedal device for an autonomous vehicle, including a pedal pad mounted to penetrate a vehicle body panel, provided in the space below the driver's seat to separate an engine compartment space and a passenger compartment space from each other, the pedal pad being configured to be stepped on or otherwise engaged by a driver and to be changed between a hidden state, in which the pedal pad is introduced into the engine compartment space, and a popped-up or protruding state, in which the pedal pad protrudes into the passenger compartment space, and an actuator configured to generate power to rotate the pedal pad so that the pedal pad enters the hidden state or the popped-up state.

The foldable pedal device may further include a pedal case fixedly mounted to the vehicle body panel to be disposed in the engine compartment space. A hinge shaft may be formed at the lower end of the pedal pad, and may be rotatably coupled to the pedal case. The pedal pad may be mounted with the upper end portion thereof rotatable in a forward-backward direction about the hinge shaft formed at the lower end thereof.

When the pedal pad rotates forwards about the hinge shaft formed at the lower end thereof, the pedal pad may enter the hidden state, in which the pedal pad is introduced into the engine compartment space. When the pedal pad rotates backwards about the hinge shaft formed at the lower end thereof, the pedal pad may enter the popped-up state, in which the pedal pad protrudes into the passenger compartment space.

The foldable pedal device may further include a pad spring mounted such that a first end thereof is supported by the pedal case and a second end thereof is supported by the pedal pad. When the driver engages the pedal pad, the pedal pad may be rotated forwards about the hinge shaft, and the pad spring may be compressed and accumulate elastic force. When the driver releases the pedal pad, the pedal pad may be rotated backwards by the elastic force accumulated in the pad spring, and may return to an original position thereof.

The pad spring may include a first spring and a second spring having different spring forces from each other. The pedal pad may have therein a spring-seating recess formed to be open in a forward direction. The second end of the pad spring may be inserted into and supported by the spring-seating recess. The pedal pad may include a body portion that penetrates a panel aperture formed in the vehicle body panel, a rear surface formed to cover the back side of the body portion and to be engaged by the driver, and a front surface formed to cover the front side of the body portion. The overall size of each of the rear surface and the front surface of the pedal pad may be set to be greater than the size of the panel aperture so that the rear surface or the front surface seals the panel aperture in the hidden state or the popped-up state of the pedal pad.

The top surface and the bottom surface of the body portion may be formed in the shape of an arc that extends in a circumferential direction about the hinge shaft, and the top surface may be formed to be longer than the bottom surface. The actuator may include a straight-driving motor fixedly mounted in the pedal case, a plunger configured to be linearly pulled or pushed by operation of the straight-driving motor, and a plunger spring mounted to support the plunger. A pad-operating part may be integrally formed with the hinge shaft, and may protrude into the pedal case. The plunger may be in contact with the pad-operating part in the hidden state and the popped-up state of the pedal pad.

The spring force of the plunger spring may be set to be greater than the spring force of the pad spring. When power is supplied to the straight-driving motor, the plunger may be pulled into the straight-driving motor, the plunger spring may be compressed and accumulate elastic force, and the pedal pad may be rotated backwards about the hinge shaft by the elastic force of the pad spring and may pop up in the passenger compartment space.

When the supply of power to the straight-driving motor is interrupted, the plunger may be pushed out of the straight-driving motor by the elastic force of the plunger spring, the pad-operating part may be pushed by the plunger, the pedal pad may rotate forwards about the hinge shaft, the pad spring may be compressed and accumulate elastic force, and the pedal pad may be hidden in the engine compartment space. The foldable pedal device may further include a non-contact pedal sensor fixedly mounted in the pedal case and including a printed circuit board provided therein, a hinge-shaft protrusion that protrudes from the hinge shaft toward the non-contact pedal sensor, and a permanent magnet coupled to the hinge-shaft protrusion to face the non-contact pedal sensor.

The non-contact pedal sensor may be configured to generate, when the pedal pad rotates, a signal associated with acceleration or a signal associated with braking by detecting the rotation angle of the pedal pad through the change in the intensity of the magnetic field in response to the change in the rotational position of the permanent magnet, and may be configured to adjust the supply of power to the straight-driving motor. When the pedal pad rotates and the position of the permanent magnet changes due to the movement of the plunger in response to the operation of the straight-driving motor, the non-contact pedal sensor may not generate a signal associated with acceleration or a signal associated with braking to prevent erroneous operation.

The non-contact pedal sensor may be configured to generate a signal associated with acceleration or a signal associated with braking only when the pedal pad in the popped-up state is manipulated by the driver in the non-operating state of the straight-driving motor and the position of the permanent magnet changes due to the rotation of the pedal pad. The pedal pad may be one of the constituent parts of an accelerator pedal device or one of the constituent parts of a brake pedal device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
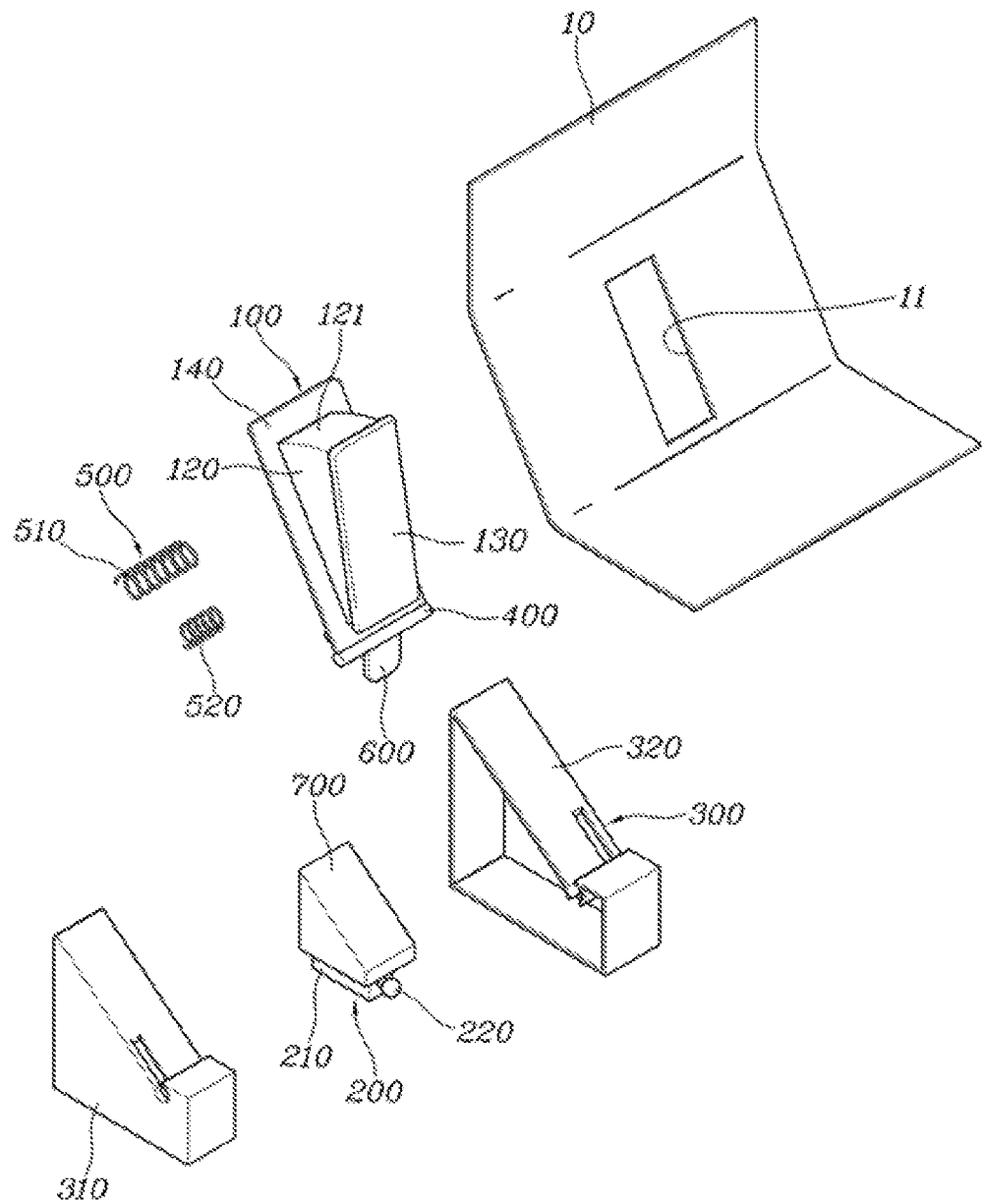
FIG. 1 is an exploded perspective view of a foldable pedal device for an autonomous vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a foldable pedal device for an autonomous vehicle according to exemplary embodiments of the present disclosure will be described with reference to the accompanying drawings.

As shown in FIGS. 1 to 6, a foldable pedal device for an autonomous vehicle according to the present disclosure may include a pedal pad 100, mounted to penetrate a vehicle body panel 10, which is provided in a space below the driver's seat to separate an engine compartment space and a passenger compartment space from each other, the pedal pad 100 being configured to be stepped on or engaged by the driver and to be changed between a hidden state, in which the pedal pad 100 is introduced into the engine compartment space, and a popped-up state, in which the pedal pad 100 protrudes into the passenger compartment space, and an actuator 200 configured to generate power to rotate the pedal pad 100 so that the pedal pad 100 enters the hidden state or the popped-up state.

The vehicle body panel 10, disposed below the driver's seat to separate the engine compartment space and the passenger compartment space from each other, may be a surface covered by carpet. The exemplary embodiment of the present disclosure may further include a pedal case 300, which is fixedly mounted to the vehicle body panel 10 to be located in the engine compartment space. The pedal case 300 may include a left case 310 and a right case 320, which are provided separately from each other. The pedal case 300 may include therein an empty internal space to accommodate the actuator 200 and a non-contact sensor to be described later.

The pedal pad 100 may include a hinge shaft 400 integrally formed therewith. The hinge shaft 400 may be formed at the lower end of the pedal pad 100, and be rotatably coupled to the pedal case 300. The pedal pad 100 may be mounted such that the upper end portion thereof is rotatable in the forward-backward direction about the hinge shaft 400 formed at the lower end thereof. When the pedal pad 100 rotates forwards about the hinge shaft 400 formed at the lower end thereof, the pedal pad 100 enters the hidden state, in which the pedal pad 100 is introduced into the engine compartment space. When the pedal pad 100 rotates backwards about the hinge shaft 400, the pedal pad 100 enters the popped-up state, in which the pedal pad 100 protrudes into the passenger compartment space.

The exemplary embodiment of the present disclosure may further include a pad spring 500, which is mounted with a first end thereof supported by the pedal case 300 and a second end thereof supported by the pedal pad 100. When the driver engages the pedal pad 100, the pedal pad 100 is rotated forwards about the hinge shaft 400, and the pad spring 500 is compressed and accumulates elastic force. When the driver releases the pedal pad 100, the pedal pad 100 is rotated backwards by the elastic force accumulated in the pad spring 500, and returns to an original position.

The pedal force may be tuned by varying the spring force of the pad spring 500. Additionally, to prevent fine vibration of the pedal pad 100, the pad spring 500 may include a first spring 510 and a second spring 520 having different spring forces from each other. However, the number of springs of the pad spring 500 is not limited to two. The pad spring 500 may be a compression coil spring.

The pedal pad 100 may include a spring-seating recess 110 formed therein and which is open in the forward direction. The second end of the pad spring 500 may be inserted into the spring-seating recess 110 to be supported thereby. Accordingly, the pad spring 500 may be mounted more stably. The pedal pad 100 may include a body portion 120, which penetrates a panel aperture 11 formed in the vehicle body panel 10, a rear surface 130, which covers the back side of the body portion 120 and may be formed to be stepped on or engaged by the driver, and a front surface 140, which covers the front side of the body portion 120.

The spring-seating recess 110 may be formed in as a concave recess in the body portion 120, and may penetrate the front surface 140 to be open in the forward direction. The overall size of each of the rear surface 130 and the front surface 140 of the pedal pad 100 may be set to be greater than the size of the panel aperture 11 formed in the vehicle body panel 10. Accordingly, when the pedal pad 100 is in the hidden state or the popped-up state, the rear surface 130 or the front surface 140 thereof seals the panel aperture 11.

When the pedal pad 100 rotates forwards about the hinge shaft 400 and is hidden in the engine compartment space, the rear surface 130 of the pedal pad 100 comes into contact with the vehicle body panel 10 and seals the panel aperture 11. When the pedal pad 100 rotates backwards about the hinge shaft 400 and pops up into the passenger compartment space, the front surface 140 of the pedal pad 100 comes into contact with the vehicle body panel 10 and seals the panel aperture 11.

In the hidden state or the popped-up state of the pedal pad 100, the rear surface 130 or the front surface 140 of the pedal pad 100 seals the panel aperture 11, thereby preventing the introduction of foreign substances into the panel aperture 11 and thus securing smooth operation of the pedal pad 100. Further, since the rear surface 130 or the front surface 140 of the pedal pad 100 seals the panel aperture 11 through contact with the vehicle body panel 10, the rear surface 130 or the front surface 140 of the pedal panel 100 also serves as a stopper for adjusting the rotation angle of the pedal pad 100.

In the pedal pad 100, a top surface 121 and a bottom surface 122 of the body portion 120 may be formed in the shape of an arc that extends in the circumferential direction about the hinge shaft 400. In the configuration of the pedal pad 100, in which the upper end portion thereof rotates in the forward-backward direction about the hinge shaft 400 formed at the lower end thereof and the body portion 120 thereof penetrates the panel aperture 11 in the vehicle body panel 10, since the top surface 121 and the bottom surface 122 of the body portion 120 may be formed in the shape of an arc that extends in the circumferential direction about the hinge shaft 400, it may be possible to minimize the formation of a gap between the top surface 121 and the panel aperture 11 or the formation of a gap between the bottom surface 122 and the panel aperture 11, thereby increasing ease of alignment with the vehicle body panel 10 and minimizing the introduction of foreign substances.

The actuator 200 according to the present disclosure may include a straight-driving motor 210 fixedly mounted in the pedal case 300, a plunger 220 linearly pulled or pushed by the operation of the straight-driving motor 210, and a plunger spring 230 mounted to support the plunger 220. The straight-driving motor 210 may be implemented as a linear motor, and may be electrically connected to a power source.

According to the present disclosure, a pad-operating part 600 may be integrally formed with the hinge shaft 400. The pad-operating part 600 may protrude into the pedal case 300. In the hidden state and the popped-up state of the pedal pad 100, the plunger 220 is in contact with the pad-operating part 600 at all times. The spring force of the plunger spring 230 of the actuator 200, may be set to be larger than the spring force of the pad spring 500. Accordingly, the pedal pad 100 may enter the popped-up state while overcoming the spring force of the pad spring 500 using the spring force of the plunger spring 230.

The exemplary embodiment of the present disclosure may further include a non-contact pedal sensor 700 fixedly mounted in the pedal case 300, a hinge-shaft protrusion 800, which protrudes from the hinge shaft 400 toward the non-contact pedal sensor 700, and a permanent magnet 900 coupled to the hinge-shaft protrusion 800 to face the non-contact pedal sensor 700. The non-contact pedal sensor 700 may include a printed circuit board (PCB), which is provided therein to face the permanent magnet 900. The PCB is electrically connected to a power source, such as a battery, via a wire.

When the pedal pad 100 rotates about the hinge shaft 400, the hinge-shaft protrusion 800, which is connected to the hinge shaft 400, rotates, and the rotational position of the permanent magnet 900 coupled to the hinge-shaft protrusion 800 changes. In particular, the non-contact pedal sensor 700 may be configured to detect the rotation angle of the pedal pad 100 through the change in the intensity of the magnetic field in response to the change in the rotational position of the permanent magnet 900, and generate a signal associated with acceleration or a signal associated with braking.

In addition, the non-contact pedal sensor 700 may be configured to adjust the supply of power to the straight-driving motor 210, which constitutes the actuator 200. The non-contact pedal sensor 700 may advantageously reduce operation noise and further increase the accuracy of output signals compared with a contact sensor directly connected to other components via links or the like. The pedal pad 100 according to the exemplary embodiment of the present disclosure may be configured as one of the constituent parts of the accelerator pedal device or one of the constituent parts of the brake pedal device.

Figure 2:
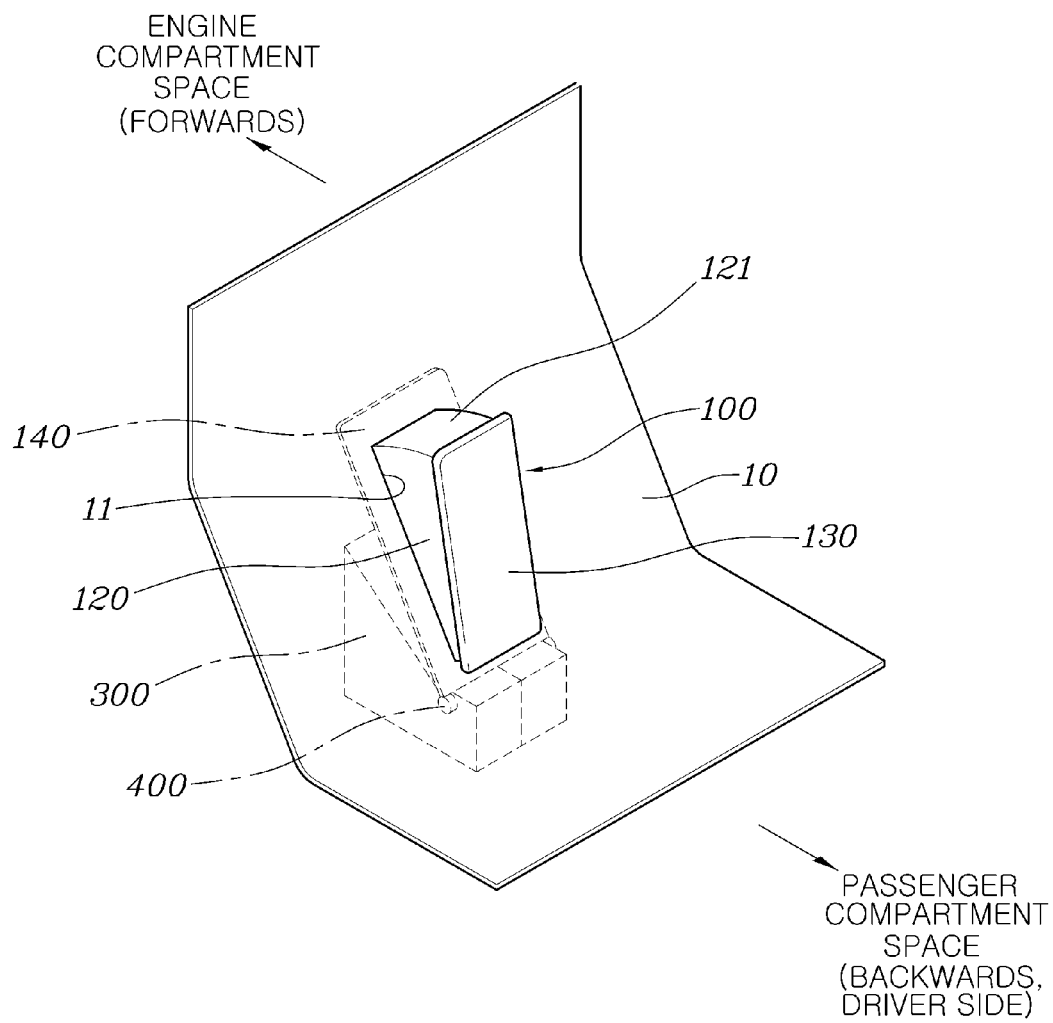
FIG. 2 is a coupled perspective view of FIG. 1 according to the present disclosure.
Figure 3:
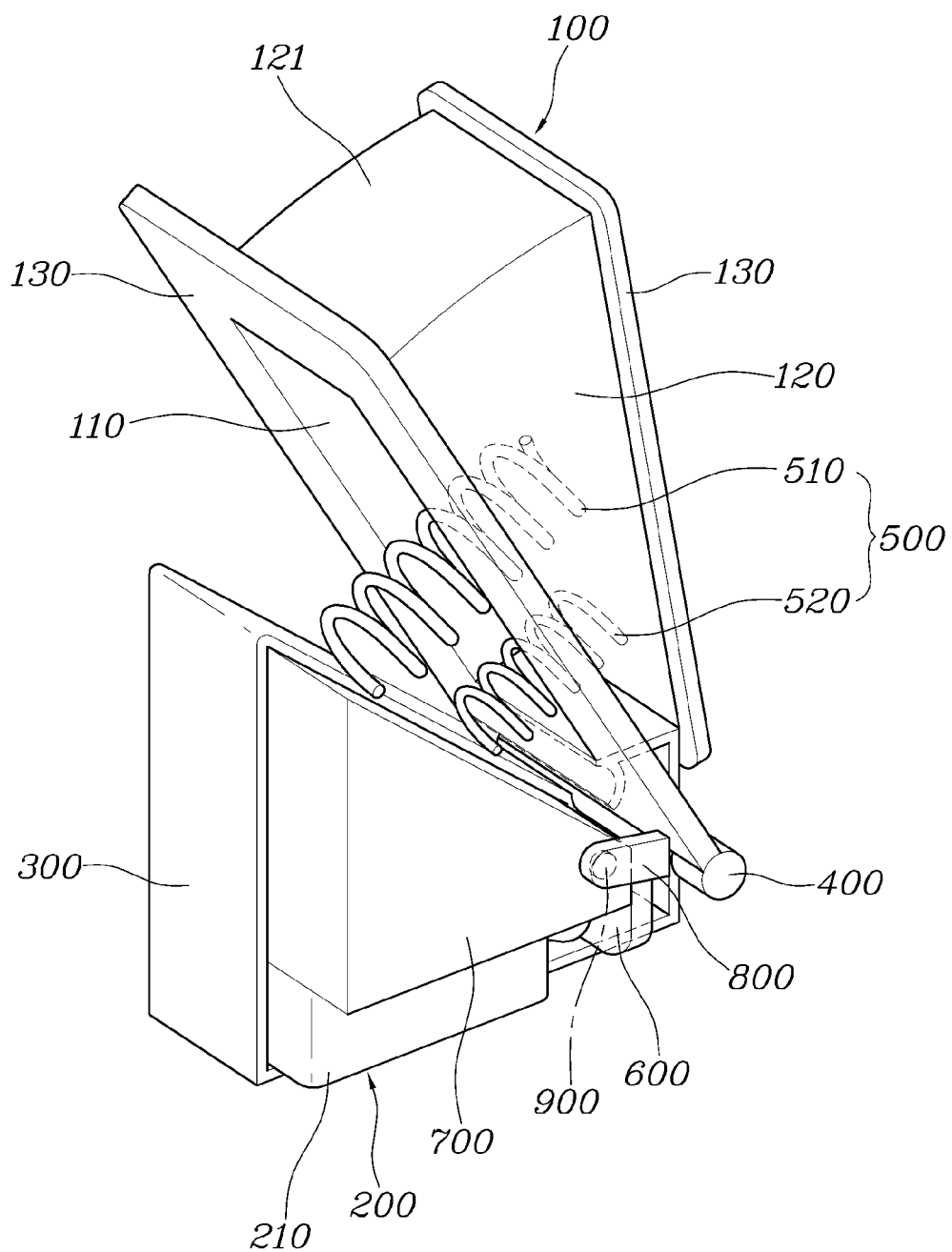
FIG. 3 is a rear view of the foldable pedal device of FIG. 2 from which a vehicle body panel and a portion of a pedal case are removed according to the present disclosure.
Figure 4:
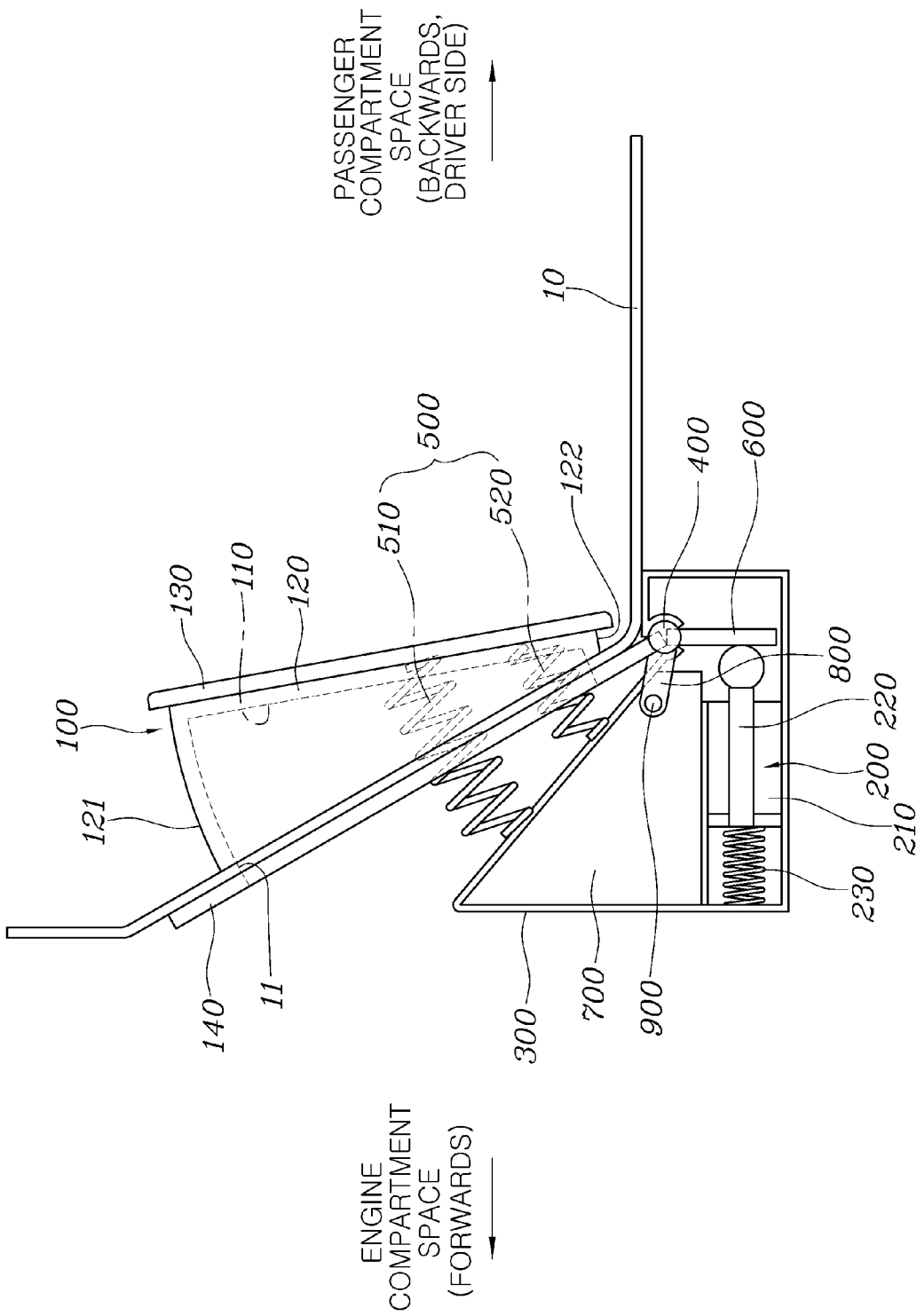
FIG. 4 is a cross-sectional view of FIG. 2, which shows a popped-up state in which a pedal pad protrudes into a passenger compartment space according to the present disclosure.

FIGS. 2 and 4 show the popped-up state in which the pedal pad 100 rotates backwards and protrudes into the passenger compartment space. When power is supplied to the straight-driving motor 210 through the control function of the non-contact pedal sensor 700, the plunger 220 may be pulled (e.g., moved to the left) into the straight-driving motor 210, and the plunger spring 230 may be compressed and accumulate elastic force. At the same time, the pedal pad 100 is rotated backwards about the hinge shaft 400 by the elastic force of the pad spring 500, and thus pops up in the passenger compartment space.

Figure 5:
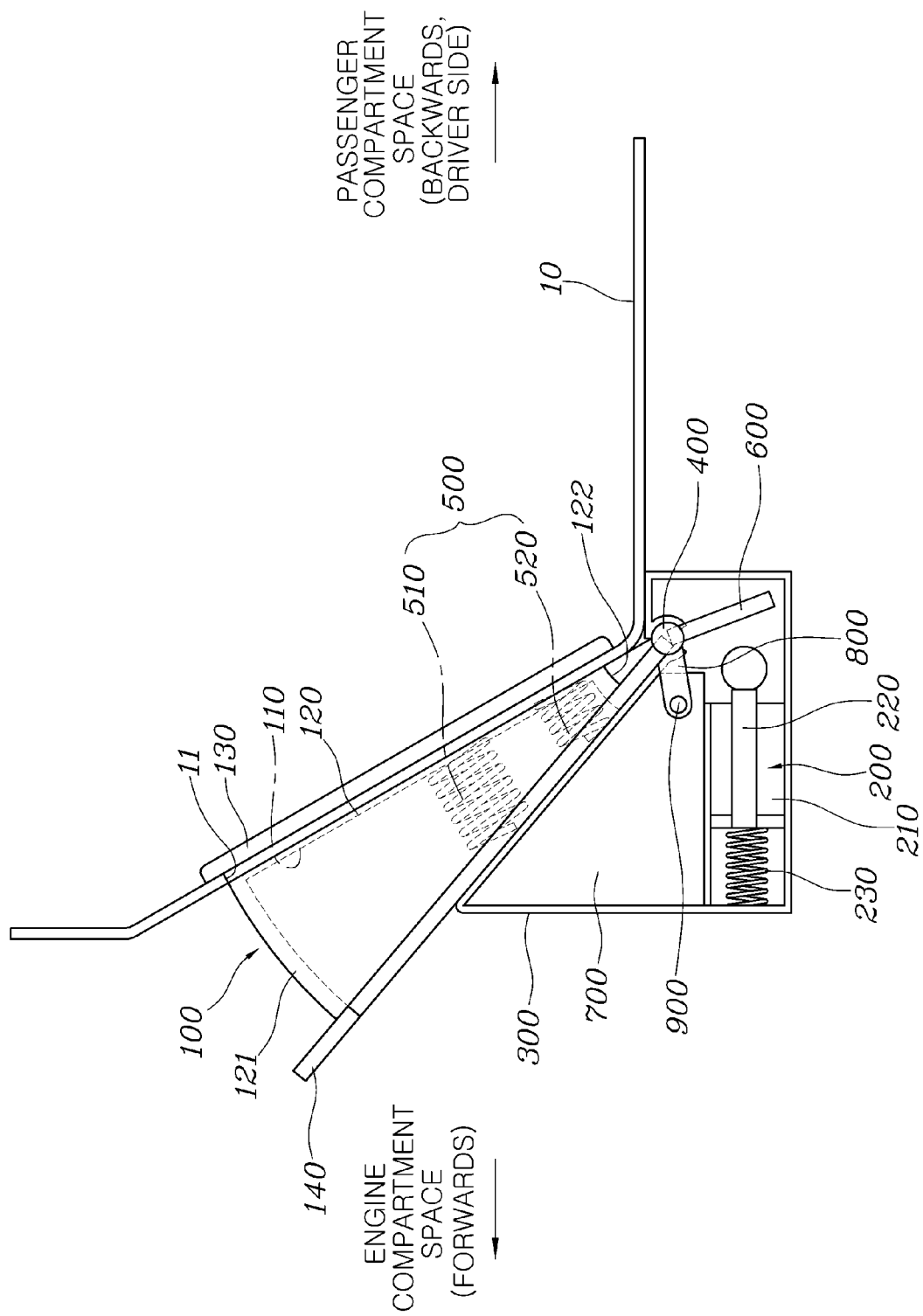
FIG. 5 is a view showing the normal rotating operation of the pedal pad of FIG. 4 according to the present disclosure.

As shown in FIG. 4, when the pedal pad 100 is in the popped-up state, in which the pedal pad 100 protrudes from the vehicle body panel 10 into the passenger compartment space, the driver is capable of performing normal manipulation by engaging the rear surface 130 of the popped-up pedal pad 100. FIG. 5 shows the state in which the pedal pad 100 popped up in the passenger compartment space is stepped on or engage by the driver and is pushed forwards.

When the driver engages the pedal pad 100 popped up in the passenger compartment space, the pedal pad 100 rotates forwards about the hinge shaft 400, the pad spring 500 is compressed, and the pad-operating part 600 rotates backwards and moves away from the plunger 220. At the same time, the hinge-shaft protrusion 800 connected to the hinge shaft 400 rotates due to the rotation of the pedal pad 100, and the rotational position of the permanent magnet 900 coupled to the hinge-shaft protrusion 800 changes. In particular, the non-contact pedal sensor 700 may be configured to detect the rotation angle of the pedal pad 100 through the change in the intensity of the magnetic field in response to the change in the rotational position of the permanent magnet 900, and generate a signal associated with acceleration or a signal associated with braking.

Figure 6:
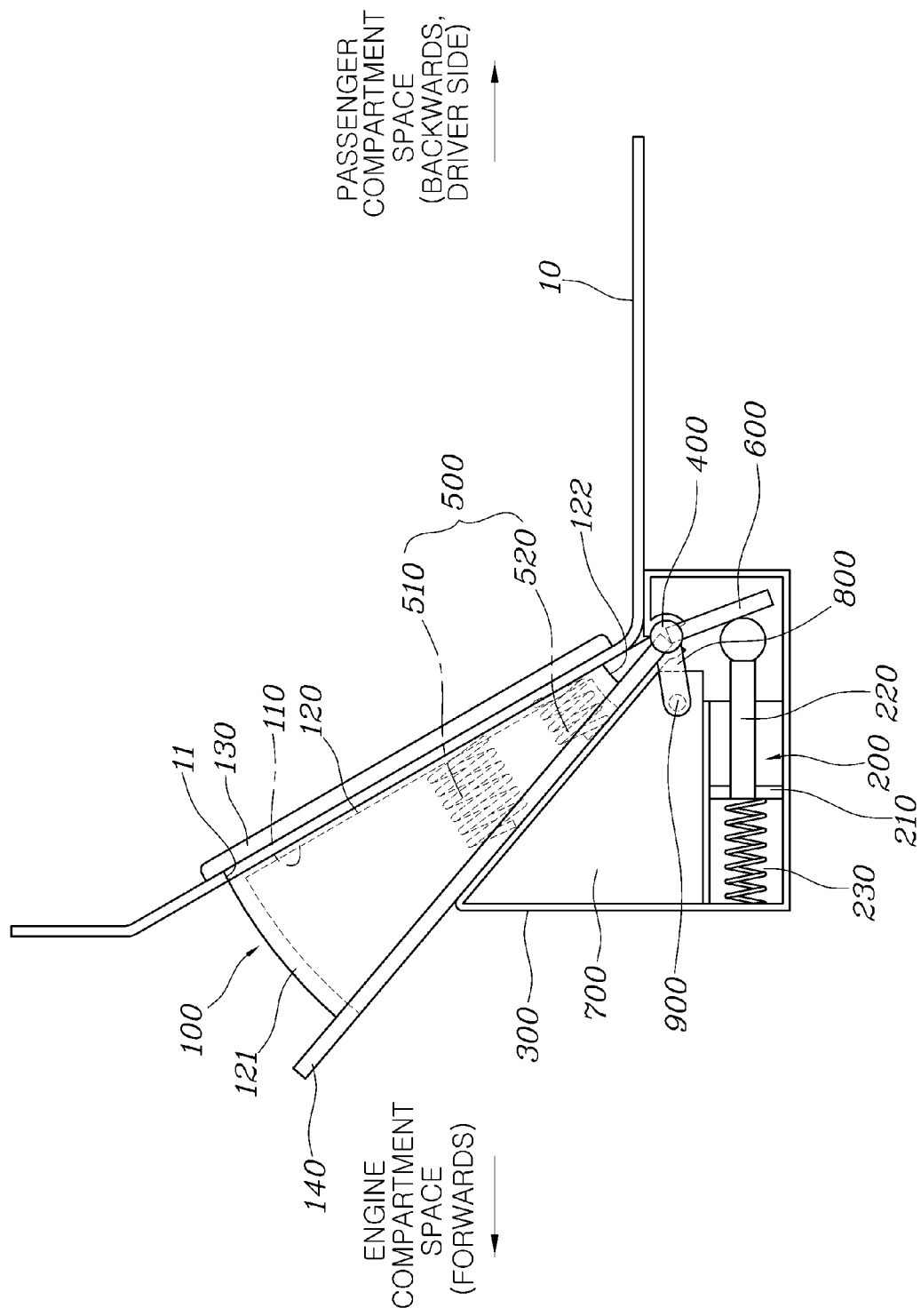
FIG. 6 is a view showing a hidden state in which the pedal pad of FIG. 4 is introduced into an engine compartment space according to the present disclosure.

FIG. 6 shows the hidden state in which the pedal pad 100 rotates forwards to be hidden in the engine compartment space and to be prevented from being exposed to the passenger compartment space. When the supply of power to the straight-driving motor 210 is interrupted through the control function of the non-contact pedal sensor 700, the plunger 220 may be pushed (e.g., moved to the right) out of the straight-driving motor 210 by the elastic force of the plunger spring 230, and the pad-operating part 600 may be pushed by the plunger 230. Accordingly, the pedal pad 100 rotates forwards about the hinge shaft 400, and the pad spring 500 may be compressed and accumulate elastic force. As a result, the pedal pad 100 may be hidden in the engine compartment space.

As shown in FIG. 6, when the pedal pad 100 is in the hidden state, the space below the driver's seat increases, and thus the driver is capable of resting comfortably in a relaxation mode without interference with the pedal. Further, it may be possible to secure safety by preventing erroneous manipulation of the pedal in the autonomous driving mode.

The exemplary embodiment of the present disclosure is characterized in that, when the pedal pad 100 rotates and the position of the permanent magnet 900 changes due to the linear movement of the plunger 220 in response to the operation of the straight-driving motor 210, the non-contact pedal sensor 700 does not generate a signal associated with acceleration or a signal associated with braking to prevent an accident attributable to erroneous manipulation of the pedal. In other words, when the pedal pad 100 enters the popped-up state shown in FIG. 4 or the hidden state shown in FIG. 6 due to the operation of the actuator 200, the non-contact pedal sensor 700 does not generate a signal associated with acceleration or a signal associated with braking in spite of the change in position of the permanent magnet 900, thereby preventing an accident attributable to erroneous manipulation of the pedal.

However, the non-contact pedal sensor 700 may be configured to generate a signal associated with acceleration or a signal associated with braking only when the driver manipulates the popped-up pedal pad 100 in the non-operating state of the actuator 200 and the position of the permanent magnet 900 changes due to the rotation of the pedal pad 100, as shown in FIG. 5, thereby further securing stable operation.

As is apparent from the above description, according to the foldable pedal device for an autonomous vehicle of the present disclosure, in a manual driving mode, in which the driver directly operates the vehicle, the pedal pad 100 is rotated backwards and is popped up in the passenger compartment space by the operation of the actuator 200 allowing the driver to manipulate the pedal pad 100, and in an autonomous driving mode, in which the driver does not directly operate the vehicle, the pedal pad 100 is rotated forwards and is hidden in the engine compartment space by the operation of the actuator 200 to be prevented from being exposed to the passenger compartment space and from being manipulated by the driver. As a result, the driver may rest comfortably in the autonomous driving mode. Further, it may be possible to secure safety by preventing erroneous manipulation of the pedal in the autonomous driving mode.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A foldable pedal device for an autonomous vehicle, comprising:
a pedal pad mounted to penetrate a vehicle body panel, disposed in a space below a driver seat to separate an engine compartment space and a passenger compartment space from each other, the pedal pad being configured to be engaged by a driver and to be changed between a hidden state, in which the pedal pad is introduced into the engine compartment space, and a popped-up state, in which the pedal pad protrudes into the passenger compartment space; and an actuator configured to generate power to rotate the pedal pad to cause the pedal pad to enter the hidden state or the popped-up state, wherein the pedal pad includes:

a body portion penetrating a panel aperture formed in the vehicle body panel;

a rear surface formed to cover a back side of the body portion and to be engaged by the driver; and a front surface formed to cover a front side of the body portion, and wherein an overall size of each of the rear surface and the front surface of the pedal pad is set to be larger than a size of the panel aperture so that the rear surface or the front surface seals the panel aperture in the hidden state or the popped-up state of the pedal pad.

2. The foldable pedal device according to claim 1, further comprising:

a pedal case fixedly mounted to the vehicle body panel to be disposed in the engine compartment space, wherein a hinge shaft is formed at a lower end of the pedal pad, and is rotatably coupled to the pedal case, and wherein the pedal pad is mounted with an upper end portion thereof rotatable in a forward-backward direction about the hinge shaft formed at the lower end thereof.

3. The foldable pedal device according to claim 2, wherein, when the pedal pad rotates forwards about the hinge shaft formed at the lower end thereof, the pedal pad enters the hidden state, in which the pedal pad is introduced into the engine compartment space.

4. The foldable pedal device according to claim 2, wherein, when the pedal pad rotates backwards about the hinge shaft formed at the lower end thereof, the pedal pad enters the popped-up state, in which the pedal pad protrudes into the passenger compartment space.

5. The foldable pedal device according to claim 2, further comprising:

a pad spring mounted with a first end supported by the pedal case and a second end supported by the pedal pad, wherein when the pedal pad is engaged by the driver, the pedal pad is rotated forwards about the hinge shaft, and the pad spring is compressed and accumulates elastic force, and wherein when the pedal pad is released, the pedal pad is rotated backwards by the elastic force accumulated in the pad spring, and returns to an original position.

6. The foldable pedal device according to claim 5, wherein the pad spring includes a first spring and a second spring having different spring forces from each other.

7. The foldable pedal device according to claim 5, wherein the pedal pad includes therein a spring-seating recess formed to be open in a forward direction, and wherein the second end of the pad spring is inserted into and supported by the spring-seating recess.

8. The foldable pedal device according to claim 5, wherein the actuator includes:

a straight-driving motor fixedly mounted in the pedal case;

a plunger configured to be linearly pulled or pushed by operation of the straight-driving motor; and a plunger spring mounted to support the plunger, wherein a pad-operating part is integrally formed with the hinge shaft, and protrudes into the pedal case, and wherein the plunger is in contact with the pad-operating part in the hidden state and the popped-up state of the pedal pad.

9. The foldable pedal device according to claim 8, wherein a spring force of the plunger spring is set to be greater than a spring force of the pad spring.

10. The foldable pedal device according to claim 8, wherein, when power is supplied to the straight-driving motor, the plunger is pulled into the straight-driving motor, the plunger spring is compressed and accumulates elastic force, and the pedal pad is rotated backwards about the hinge shaft by the elastic force of the pad spring and pops up in the passenger compartment space.

11. The foldable pedal device according to claim 8, wherein, when supply of power to the straight-driving motor is interrupted, the plunger is pushed out of the straight-driving motor by elastic force of the plunger spring, the pad-operating part is pushed by the plunger, the pedal pad rotates forwards about the hinge shaft, the pad spring is compressed and accumulates elastic force, and the pedal pad is hidden in the engine compartment space.

12. The foldable pedal device according to claim 8, further comprising:

a non-contact pedal sensor fixedly mounted in the pedal case and including a printed circuit board provided therein;

a hinge-shaft protrusion that protrudes from the hinge shaft toward the non-contact pedal sensor; and a permanent magnet coupled to the hinge-shaft protrusion to face the non-contact pedal sensor.

13. The foldable pedal device according to claim 12, wherein when the pedal pad rotates the non-contact pedal sensor is configured to generate a signal associated with acceleration or a signal associated with braking by detecting a rotation angle of the pedal pad through a change in intensity of a magnetic field in response to a change in rotational position of the permanent magnet, and is configured to adjust supply of power to the straight-driving motor.

14. The foldable pedal device according to claim 12, wherein, when the pedal pad rotates and a position of the permanent magnet changes due to movement of the plunger in response to operation of the straight-driving motor, the non-contact pedal sensor does not generate a signal associated with acceleration or a signal associated with braking to prevent erroneous operation.

15. The foldable pedal device according to claim 12, wherein the non-contact pedal sensor is configured to generate a signal associated with acceleration or a signal associated with braking only when the pedal pad in the popped-up state is manipulated by the driver in a non-operating state of the straight-driving motor and a position of the permanent magnet changes due to rotation of the pedal pad.

16. The foldable pedal device according to claim 1, wherein a top surface and a bottom surface of the body portion are formed in a shape of an arc that extends in a circumferential direction about the hinge shaft, and wherein the top surface is formed to be longer than the bottom surface.

17. The foldable pedal device according to claim 1, wherein the pedal pad is one of constituent parts of an accelerator pedal device or one of constituent parts of a brake pedal device.

* * * * *